United States Patent Office 3,730,722
Patented May 1, 1973

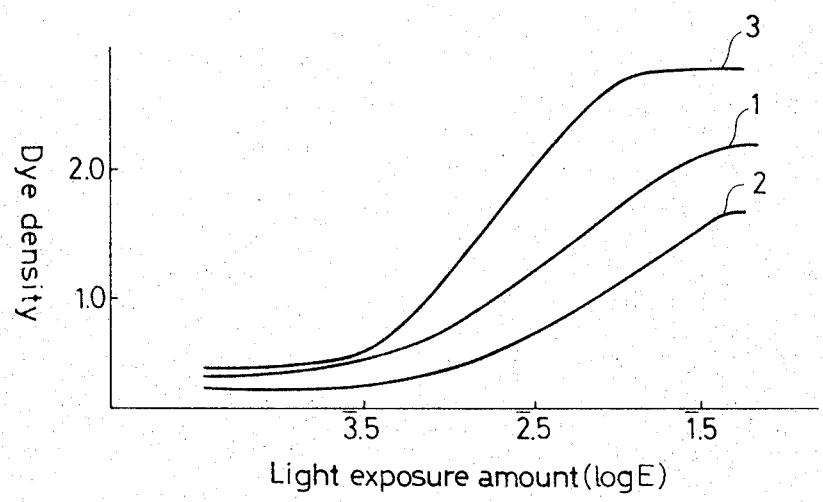

3,730,722
YELLOW COUPLER AND ITS USE
Isaburo Inoue, Takaya Endo, Syunji Matsuo, Masahiko Taguchi, and Toshihiko Yamamoto, Tokyo, Japan, assignors to Konishiroku Photo Industry Co., Ltd.
Filed Nov. 20, 1970, Ser. No. 91,404
Claims priority, application Japan, Nov. 26, 1969, 44/94,274
Int. Cl. G03c 7/00
U.S. Cl. 96—56.3
1 Claim

ABSTRACT OF THE DISCLOSURE

A coupler capable of forming a yellow color image in color photography has an open chain active methylene group bonded to two adjacent carbonyl groups. One of the hydrogen atoms of the active methylene is substituted by a group of the formula

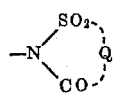

wherein Q is

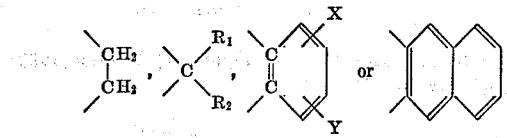

$R_1$ and $R_2$ are lower alkyl, X is hydrogen, halogen or alkoxy, and Y is hydrogen, halogen, amino, acylamide, ureide, lower alkyl, alkoxy or hydroxy. A method is disclosed for forming a yellow color image on a light sensitive color photographic material using this coupler. The developed yellow color image exhibits excellent light and humidity fastness.

This invention relates to a new yellow coupler capable of forming a yellow color image on a light-sensitive color photographic material. More paticularrly, the invention pertains to a method for forming a yellow color image on a light-sensitive color photographic material using a novel divalent yellow dye image-forming coupler.

A photographic process for forming a dye image by exposing a coupler-containing photographic material to light and then subjecting the material to color development by use of a developer containing an aromatic primary amine type developing agent as a main ingredient has already been well known. Among the couplers used in the said process, the yellow coupler has an active methylene group, which is useful for forming a dye by coupling with an oxidation product of the aromatic primary amine type developing agent. In case the said active methylene group is a non-substituted group, 4 mols of a silver halide is required in the color development in order to form 1 mol of a dye. That is, in the above case, the coupler is a so-called tetravalent coupler. However, it is well known that the same dye as in the case of the tetravalent coupler can also be formed from a coupler in which one of the hydrogen atoms of active methylene has been substituted by such a halogen atom as chlorine. In this case, the halogen atom is released in the course of color development, and 2 mols of the developed silver halide can form 1 mol of a dye, so that the said coupler is called as a divalent coupler. The divalent coupler is more advantageous than the tetravalent coupler in the following points:

(1) The coupling rate is higher than in the case of the conventional tetravalent coupler.

(2) The amount of silver halide required for forming a given amount of dye may be one half the amount required in the case of the tetravalent coupler, so that the costs can be reduced.
(3) The emulsion layer can be made thinner, so that the resulting color image is enhanced in resolving power and sharpness.
(4) In the case of a multi-layered photographic material, the light transmission to the lower layers is improved to increase the photographic speed.

For the above reasons, the use of the divalent coupler results in marked advantages in forming a color image in a multi-layered color photographic material. Such advantageous properties are particularly marked in the case where one of the hydrogen atoms of active methylene in a yellow image-forming coupler containing an open-chain methylene group has been substituted by such a cyclic acid imide as

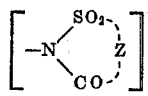

This substituted component has a property to be released at the time of color development.

A certain divalent coupler tends to form color stains and has a development-inhibiting property. However, a yellow dye formed by the aforesaid color development from the yellow coupler of the present invention is excellent in resistance to light, humidity and heat, has no unnecessary absorptions in the long wavelength region, is less in absorption in the green light region, and provides an extremely desirable color tone in the reproduction of color.

The coupler used in the present invention is a divalent coupler of the general formula,

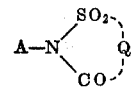

wherein A is a yellow image-forming coupler residue having an open-chain methylene group;

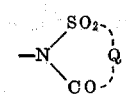

is a group substituted in one of the hydrogen atoms of active methylene bonded to 2 carbonyl groups of the open-chain methylene group of the yellow image-forming coupler residue A; and Q is

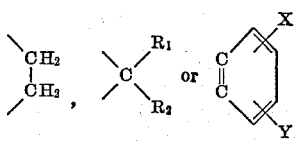

where $R_1$ and $R_2$ are lower alkyl; X is hydrogen, halogen or alkoxy; and Y is hydrogen, halogen, amino, acylamido, ureido, lower alkyl, alkoxy, hydroxy, or an atomic group necessary to form a benzene ring together with X.

The divalent coupler used in the present invention is characterized in that one of the hydrogen atoms of active methylene in the coupler has the group

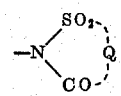

Typical examples of the coupler used in the present invention are enumerated below, but couplers usable in the present invention are not limited only to these.

(1) α-Benzosulfimide-α-pivalyl-2-chloro-5-[γ-(2,4-di-tert-amylphenoxy)butylamide]acetanilide

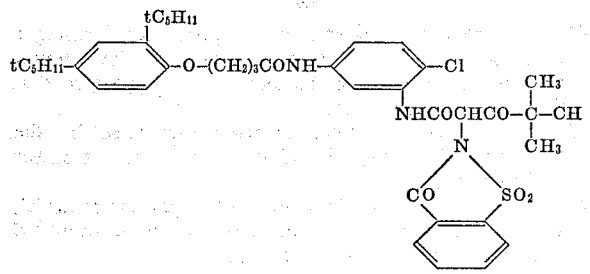

(2) α-(6 - chlorobenzosulfimide)-α-pivalyl-2-chloro-5-[γ-(2,4-di-tert-amylphenoxy)butylamide]acetanilide

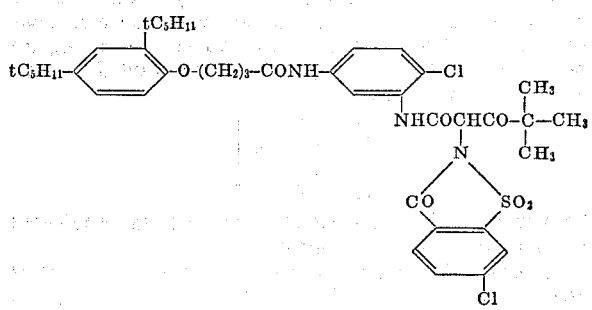

(3) α-(β-Sulfopropionimide)-α-pivalyl-2-chloro-5-[γ-(2,4-di-tert-amylphenoxy)butylamide]acetanilide

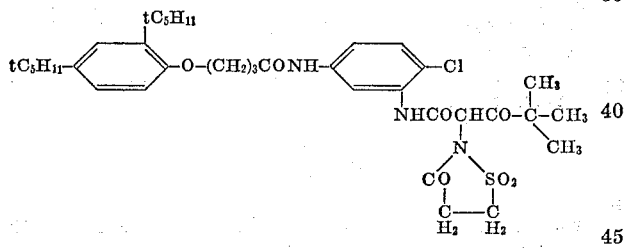

(4) α-(6-acetamidobenzosulfimide)-α-benzoyl-2-dodecyloxyacetanilide

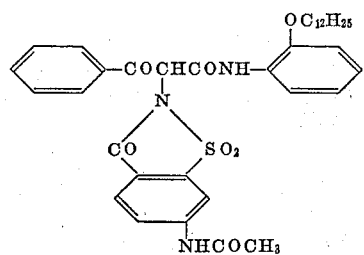

(5) α - (6-p-ethoxyphenylureidobenzosulfimide)-α-(4-n-octadecyloxybenzoyl)-2-methoxyacetanilide

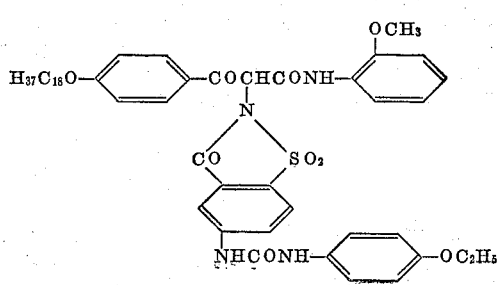

(6) Sodium α-(6-acetamidobenzosulfimide)-α-(4-n-octadecyloxybenzoyl)-2-methoxy-5-sulfoacetanilide

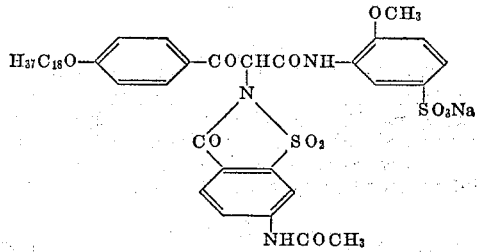

(7) α - (α-Sulfo-α-butyl-butylimide)-α-{3-[α-(2,4-di-tert-amylphenoxy)butylamide]benzoyl} - 2 - methoxyacetanilide

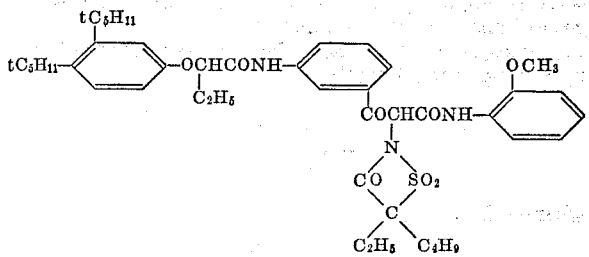

(8) α-Benzosulfimide-α-benzoyl-2-phenoxy-5-dodecyloxycarbonyl acetanilide

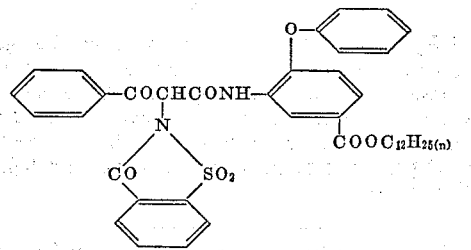

(9) α - (6 - hydroxybenzosulfimide)-α-{3-[α-(2,4-di-tert-amylphenoxy)butylamide]benzoyl} - 2 - methoxyacetanilide

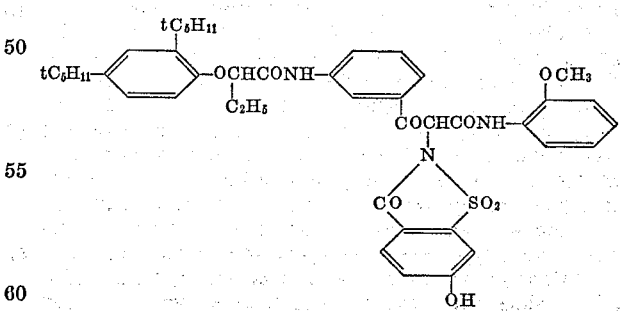

(10) α-(5-methoxybenzosulfimide)-α-benzoyl-2-methoxy-5-[α-(3-dodecyloxyphenoxy)butylamide]acetanilide

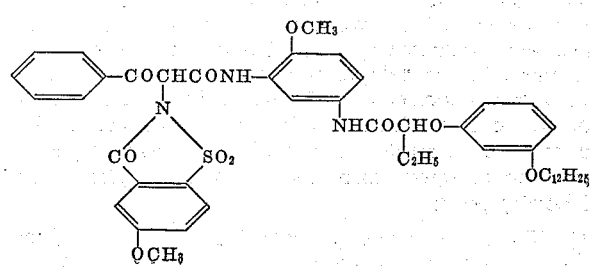

(11) 3 - [α - (7-chlorobenzosulfimide)-α-(2-methoxybenzoyl)acetamide]-[1 - (n-dodecyloxycarbonyl)ethyl]-4-chlorobenzoate

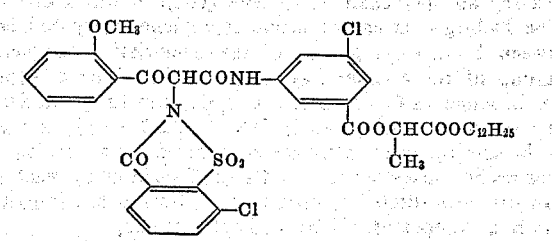

(12) 3-[α-(naphthosulfimide)-α-(2-methoxybenzoyl)acetamide]-(n-dodecyloxycarbonylmethyl) - 4 - chlorobenzoate

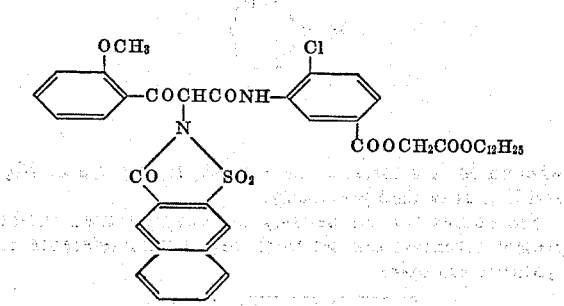

(13) α-(5-acetamidobenzosulfimide) - α - heptadecanoyl-2-chloroacetanilide

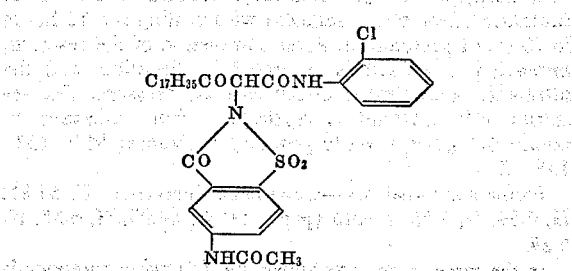

(14) α-(α-Sulfo-α-methylpropionimide) - α - (2-n-dodecyloxybenzoyl)-2,5-dichloroacetanilide

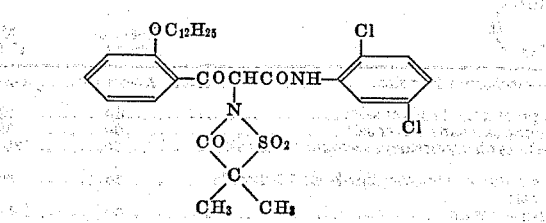

(15) α-(5,6-dichlorobenzosulfimide) - α - benzoyl-5-[α-(2,4,6-trichlorophenoxy)laurylamide] - 2 - methoxyacetanilide

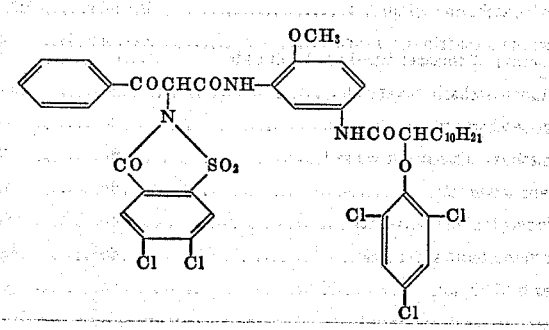

(16) 3-[α-(6-chlorobenzosulfimide) - α - (2-methylbenzoyl)acetamide] - (n - dodecyloxycarbonylmethyl)-4-chlorobenzoate

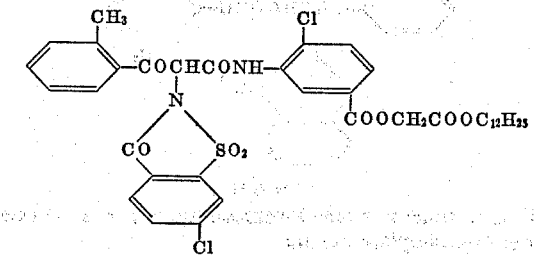

(17) α-(4,5-dimethoxybenzosulfimide) - α - benzoyl-2-chloro-5-octadecylsuccinimide acetanilide

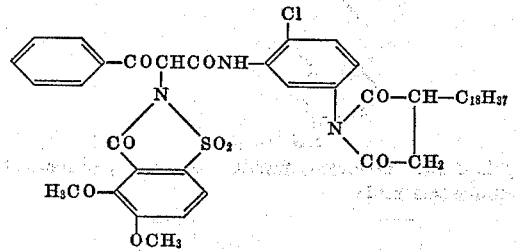

(18) α - Benzosulfimide-α-benzoyl - 2 - chloro-5-octadecylsuccinimide acetanilide

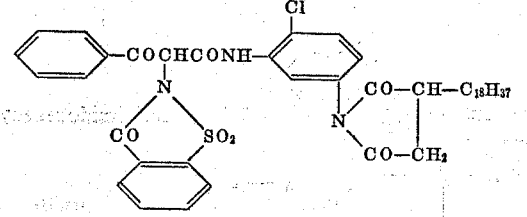

(19) α-(β-Sulfopropionimide) - α - {3-[α-(4-chloro-3,5-dimethylphenoxy)laurylamide]benzoyl} - 2 - methoxyacetanilide

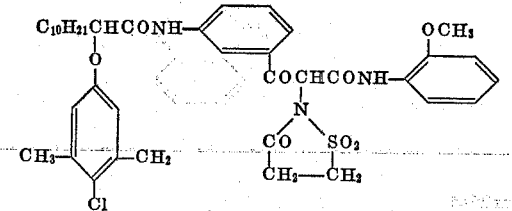

(20) α-(5-methylbenzosulfimide) - α - (2-methoxybenzoyl)-5-[γ-(2,4-di-tert - amylphenoxy)butylamide]-2-chloroacetanilide

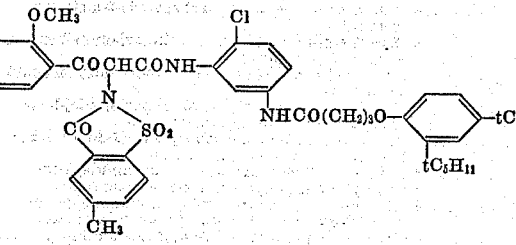

(21) α-(6-tridecanoylamidobenzosulfimide) - α - benzoylacetanilide

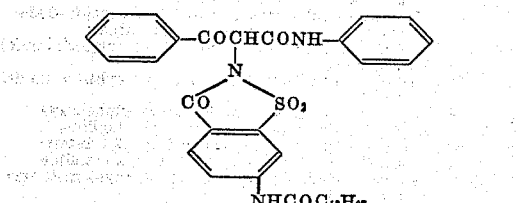

(22) α-(6-aminobenzosulfimide) - α - benzoyl-2-methoxy-acetanilide hydrochloride

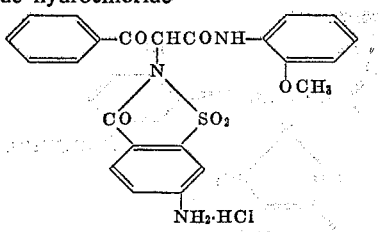

(23) α-(6-tridecanoylamidobenzosulfimide) - α - benzoyl-4-sulfamylacetanilide

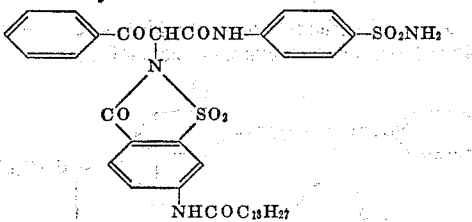

(24) Sodium α-benzosulfimide - α - furoyl-2-methoxy-5-sulfoacetanilide

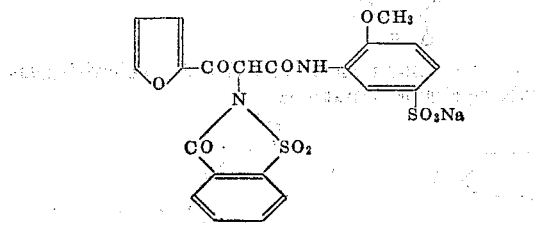

(25) α-Benzosulfimide - α - 3 - dodecylsuccinimidobenzoyl-methoxyacetanilide

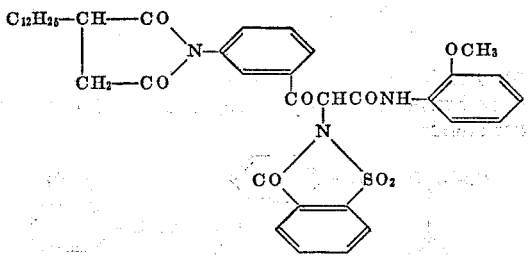

The above-mentioned compounds can be synthesized, in general by reacting in an inert solvent, e.g. benzene, acetone or acetonitrile, a yellow image-forming coupler having an open-chain methylene group in which one of the hydrogen atoms of active methylene interposed between 2 carbonyl groups of the open-chain methylene group of the coupler has been substituted by chlorine or bromine (α-Cl-substituted couplers can be synthesized by the process disclosed in U.S. Pat. 2,728,658, and an α-Br-substituted couplers can be synthesized according to the process disclosed in U.S. Pat. 2,728,658 or by reacting an α-non-substituted compound with N-bromosuccinimde) with a compound of the general formula,

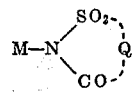

wherein M is a metal atom, e.g. Na, K, Ag, Ca or Mg; and Q is as defined previously.

Procedures for synthesizing the couplers used in the present invention are set forth below with reference to synthesis examples.

SYNTHESIS EXAMPLE 1

Synthesis of exemplified compound (1): A mixture comprising 6.4 g. of α-pivalyl-α-bromo-2-chloro-5-[γ-2,4-di-tert-amylphenoxy)butylamide]acetanilide and 8.7 g. of saccharin silver salt is refluxed with boiling for 12 hours in 70 cc. of acetonitrile. After completion of the reaction, unreacted silver salt is separated by filtration, and the filtrate is concentrated under reduced pressure. The resulting oily material is crystallized from n-hexane to obtain 6.0 g. of a white powdery substance, M.P. 133–135° C.

Elementary analysis.—Calculated (percent): C, 63.85; H, 6.56; N, 5.55. Found (percent): C, 64.03; H, 6.55; N, 5.29.

In the same manner as above, the following compounds can be obtained.

| Exemplified compound | A | $\begin{array}{c}SO_2\\M-N\quad Q\\CO\end{array}$ | Reaction solvent | M.P. (° C.) |
|---|---|---|---|---|
| (2) | α-Pivalyl-α-bromo-2-chloro-5-[γ-(2,4-di-tert-amylphenoxy)butylamide]acetanilide. | 6-chloro-saccharin silver slat | Acetonitrile | 142–143 |
| (3) | do | β-Sulfo-propionimide silver salt | do | 98–99 |
| (4) | α-Chloro-α-benzoyl-2-n-dodecyloxyacetanilide | 6-acetamide-saccharin silver salt | do | 85–86 |
| (5) | α-Chloro-A-(4-n-octadecyloxybenzoyl)-2-methoxy acetanilide. | 6-(3-p-ethoxyphenylureide) saccharin silver salt | do | 136–137 |
| (7) | α-[3-[α-(2,4-di-tert-amylphenoxy)butylamide]benzoyl]-α-chloro-2-methoxyacetanilide. | 4-ethyl-4-butyl-1,2-thiaazetidine-3-one-1,1-dioxide silver salt. | do | 60–61 |
| (8) | α-Chloro-α-benzoyl-2-phenoxy-5-dodecyloxycarbonyl acetanilide. | Saccharin silver salt | do | 105–106 |
| (9) | α-[3-[α-(2,4-di-tert-amylphenoxy)butylamide]-benzoyl]-α-chloro-2-methoxyacetanilide. | 6-hydroxy-saccharin silver salt | do | 96–97 |
| (10) | α-Bromo-α-benzoyl-2-n-methoxy-5-[α-(3-dodecyloxyphenoxy)-butylamide]acetanilide. | 5-methoxy-saccharin sodium salt | Benzene | 153–154 |
| (11) | 3-[α-chloro-β-(2-methoxybenzoyl)acetamide]-1-(n-dodecyloxycarbonyl)ethyl]-4-chlorobenzoate. | 7-chloro-saccharin sodium salt | Acetonitrile | 94–95 |
| (12) | 3-[α-chloro-α-(2-methoxybenzoyl)acetamide]-[1-(n-dodecyloxycarbonyl)methyl]-4-chlorobenzoate. | 5,6-benzo-saccharin sodium salt | Benzene | 134–135 |
| (13) | α-Chloro-α-heptadecanoyl-2-chloroacetanilide | 5-acetamide-saccharin silver salt | Acetonitrile | 98–99 |
| (14) | α-Chloro-α-(2-n-dodecyloxybenzoyl)-2,5-dichloro-acetanilide. | 4,4-dimethyl-1,2-thiaazetidine-3-one-1,1-dioxide silver. | do | 72–73 |
| (15) | α-Bromo-α-benzoyl-5-[α-(2,4,6-trichlorophenoxy) laurylamide]-2-methoxyacetanilide. | 5,6-dichloro-saccharin silver salt | do | 135–136 |
| (16) | 3-[α-chloro-α-(2-methylbenzoyl)acetamide]-(n-dodecyloxycarbonylmethyl)-4-chlorobenzoate. | 6-chloro-saccharin silver salt | do | 98–99 |
| (17) | α-Bromo-α-benzoyl-2-chloro-5-(octadecylsuccinimide) acetanilide. | 4,5-dimethoxy-saccharin silver salt | do | 63–64 |
| (18) | α-Chloro-α-benzoyl-2-chloro-5-(octadecylsuccinimide) acetanilide. | Saccharin silver salt | do | 72–73 |
| (19) | α-Bromo-α-[3-[α-(4-chloro-3,5-dimethylphenoxy) laurylamide]benzoyl]-2-methoxyacetanilide. | β-Sulfo-propionimide silver salt | do | 85–86 |
| (20) | α-Chloro-α-(2-methoxybenzoyl)-5-[γ-(2,4-di-tert-amylphenoxy)butylamide]-2-chloroacetanilide. | 5-methyl-saccharin sodium salt | do | 143–144 |
| (25) | α-Bromo-α-3-dodecylsuccinimidobenzoyl-2-methoxyacetanilide. | Saccharin silver salt | do | 95–96 |

SYNTHESIS EXAMPLE 2

Synthesis of exemplified compound (6)

A mixture comprising 5.7 g. of α-chloro-α-(4-n-octadecycloxybenzoyl)-2-methoxy-5-fluorosulfonyl acetanilide and 7.0 g. of 6-acetamide saccharine silver salt is refluxed with boiling for 18 hours in acetonitrile. After completion of the reaction, unreacted silver salt is separated by filtration, and then the filtrate is concentrated under reduced pressure. The resulting oily substance is dissolved in 100 ml. of acetone. To this solution is added a solution of 8 g. of caustic soda in 150 cc. of water. The mixed solution is refluxed with boiling for 30 minutes and then charged with acetic acid, whereby oily materials are separated to the upper layer. The oily materials are collected and recrystallized from ethanol to obtain 8.5 g. of a pale yellow white powdery substance, M.P. more than 250° C.

In the same manner as above, corresponding nitro compounds are formed into reduced amino compounds, which are then hydrochlorinated or acylated to synthesize the exemplified compounds (21), (22) and (23), M.P. 115–117° C., more than 270° C. and more than 270° C., respectively.

Further, a mixture comprising α - chloro - α-furoyl-2-methoxy-5-fluorosulfonyl acetanilide and saccharin silver salt is treated according to the process of Synthesis Example 2, whereby the exemplified compound (24) can be obtained, M.P. more than 260° C.

Developing agents used for yellow color image formation of the light sensitive color photographic materials are such aromatic primary amine silver halide developing agents as:

diethyl-p-phenylenediamine hydrochloride,
monomethyl-p-phenylenediamine hydrochloride,
dimethyl-p-phenylenediamine hydrochloride,
2-amino-5-diethylaminotoluene hydrochloride,
2-amino-5-(N-ethyl-N-dodecylamino)-toluene,
N-ethyl-β-methanesulfonamidoethyl-3-methyl-4-aminoaniline sulfate,
N-ethyl-β-methanesulfonamidoethyl-4-aminoaniline, and
4-N-ethyl-N-β-hydroxyethyl aminoaniline.

p-Aminophenols in which the amino groups have not been substituted also can be used in alkaline developing solutions. Further, some of the couplers used in the present invention may be incorporated into alkaline developing solutions. The developing solutions may contain an alkali metal sulfide, carbonate, bisulfide, bromide or iodide.

A typical example of developing solutions containing the couplers used in the present invention is as follows:

|  | G. |
|---|---|
| 2-amino-4-diethylaminotoluene hydrochloride | 2.0 |
| Anhydrous sodium sulfite | 2.0 |
| Anhydrous sodium carbonate | 20.0 |
| Potassium bromide | 1.0 |
| Exemplified coupler (22) | 2.0 |
| Water to make 1,000 ml. | |

In order to incorporate the couplers used in the present invention into light-sensitive color photographic emulsion, there may be adopted any of the known procedures. For example, one or more of the couplers are dissolved in a high boiling solvent having a boiling point of more than 175° C. such as tricresyl phosphate or dibutyl phthalate, a low boiling solvent such as butyl acetate or butyl propionate, or a mixture of said high and low boiling solvents. This solution is mixed with an aqueous gelatine solution containing a surface active agent and then emulsified and dispersed by means of a high speed rotary mixer or a colloid mill. Thereafter, the resulting dispersion is added directly to a silver halide photographic emulsion, or is set, finely cut, freed from the low boiling solvent by water-washing or the like means and then added to the emulsion. Subsequently, the emulsion is coated on a support and then dried to obtain a light-sensitive silver halide photographic material. In this case, the amount of the coupler to be added to the light-sensitive silver halide photographic emulsion is preferably 10 to 300 g. per mol of the silver halide, in general, but the amount is variable depending on application purposes.

The divalent yellow dye image-forming couplers used in the present invention, e.g. the exemplified couplers (2), (3), (7), (12), (17) and (18), can be dispersed in the same manner as above into emulsions without using high boiling solvents, and the exemplified coupler (6) can be dissolved in aqueous alkali and then dispersed in the emulsion. Further, the exemplified coupler (22) can be used in admixture with a developing solution, and the exemplified couplers (21) and (23) can be used in light-sensitive materials diffusion transfer process since they form diffusing dyes.

The photographic emulsions used in the present invention may contain various silver halides such as silver chloride, silver iodobromide, and silver chlorobromide. Further, the emulsions may have been subjected to chemical sensitization or to optical sensitization using carbocyanine or merocyanine dyes, and may have been incorporated with ordinary photographic additives such as, for example, antifoggants, stabilizers, anti-stain agents, anti-irradiation agents, surface active agents, hardeners, coating aids, etc.

Light-sensitive color photographic materials containing the couplers of the present invention may be incorporated with ultraviolet absorbers, whereby the resulting color images are further improved in durability. Further, the color developing solutions may contain, in addition to the to the aforesaid developing agents, such developing aids as citrazinic acid or the like.

The present invention is illustrated in further detail below with reference to examples, but it is needless to say that the scope of the invention is not limited thereto.

EXAMPLE 1

20.0 grams of each of the exemplified couplers (2), (3), (7), (12), (17) and (18) was added to a mixture comprising 20 ml. of dibutyl phthalate and 60 ml. of ethyl acetate, and then heated to 60° C. to form a solution. This solution was added to a mixture comprising 10 ml. of a 6% aqueous solution of Alkanol (an alkylnaphthalenesulfonate produced by Du Pont) and 200 ml. of a 6% aqueous gelatine solution, and then emulsified by means of a colloid mill to prepare a coupler dispersion.

The thus prepared coupler dispersion was added to 1 kg. of a high speed silver iodobromide emulsion, which was then coated on a film base and dried to obtain a light-sensitive photographic material having a stable coating. This photographic material was exposed to light according to an ordinary procedure, developed at 20° C. for 10 minutes with a developing solution of the composition shown below, and then subjected to ordinary stopping, fixing and bleaching treatments.

Composition of developing solution

|  | G. |
|---|---|
| N-ethyl-N-β-methanesulfonamidoethyl - 3 - methyl-4-aminoaniline sulfate | 5.0 |
| Anhydrous sodium sulfite | 2.0 |
| Benzyl alcohol | 3.8 |
| Sodium carbonate (monohydrate) | 50.0 |
| Potassium bromide | 1.0 |
| Sodium hydroxide | 0.55 |
| Water to make 1,000 ml. | |

The maximum absorption (λ-max.), the maximum density (D-max.) and the storability of each of the resulting color developed images are set forth in Table 1 together with those in the case of control unsubstituted type couplers identical in structure with the couplers of the present invention.

TABLE 1

| Run No. | Coupler No. | λ-max. | D-max. | Light fastness | Humidity fastness |
|---|---|---|---|---|---|
| 1 | Control | 447 | 1.74 | 96 | 100 |
| 2 | Exemplified coupler (2) | 447 | 2.70 | 97 | 100 |
| 3 | Exemplified coupler (3) | 448 | 2.85 | 95 | 99 |
| 4 | Control | 447 | 2.28 | 84 | 99 |
| 5 | Exemplified coupler (7) | 447 | 2.60 | 85 | 100 |
| 6 | Control | 440 | 2.00 | 82 | 99 |
| 7 | Exemplified coupler (12) | 440 | 2.50 | 80 | 98 |
| 8 | Control | 452 | 2.30 | 80 | 100 |
| 9 | Exemplified coupler (17) | 453 | 2.85 | 88 | 100 |
| 10 | Exemplified coupler (18) | 452 | 2.78 | 80 | 99 |

NOTE:
Control: Unsubstituted type coupler identical in structure with the coupler of the present invention.
λ-max. and D-max.: Calculated by spectral absorption and density measurements.
Dye residual ratio: Percent residual density after treating the portion having an initial density of 1.0 under the conditions mentioned below.
Treatment conditions:
  Light fastness: Xenon arc lamp, 50° C. 30 hrs.
  Humidity fastness: 50° C. 80% RH, 7 days.

As seen in Table 1, the couplers of the present invention show excellent characteristics and are usable as multi-layer and multi-color photographic elements.

EXAMPLE 2

According to the same procedure as in Example 1, the exemplified coupler (1) was dispersed in a gelatine silver iodobromide emulsion. In this case, the amount of the silver halide was made one half of the amount used in Example 1.

As a control coupler, there was used an unsubstituted type coupler, i.e. a tetravalent coupler, having the same structure as that of the exemplified coupler (1). In this case, the silver halide was used in amounts identical with and one half of the amount used in Example 1.

Three kinds of the thus prepared dispersions were treated in the same manner as in Example 1 to obtain light-sensitive photographic materials. After exposure to light, the photographic materials were individually treated in the same manner as in Example 1.

The accompanying drawing is a graph showing the densities of yellow dye to blue light at each stage of the process set forth in Example 2 of the present invention, in which the light exposure amounts (log E) are represented by the horizontal axis and the dye densities by the vertical axis.

The densities of yellow dyes to blue light at each stage were measured by means of a densitometer and were shown in the accompanying drawing. In the drawing, the horizontal axis represents the light exposure amounts (log E) and the vertical axis represents the densities.

The curves 1 and 2 show the cases of the conventional tetravalent couplers, and the curve 3 shows the case of the exemplified coupler (1). The photographic material of the curve 1 contains the silver halide in two times the amount contained in the photographic material of the curve 2, and the photographic material of the curve 3 is identical in silver halide content with the photographic material of the curve 2. As is clear from the drawing, the divalent coupler of the present invention can successfully be used even when the amount of silver is one half of the conventional amount.

EXAMPLE 3

A dispersion of the exemplified coupler (6) in a mixed solution comprising ethanol and water was dissolved in a 10% caustic soda solution. The resulting solution was added to a gelatine solution containing 12% of gelatine and 5.13% of Alkanol B, and then neutralized by addition of acetic acid. This liquid was dispersed in a silver halide photographic emulsion containing silver iodobromide, which was then coated on a support and dried to prepare a light-sensitive photographic material.

For comparison, a control light-sensitive photographic material was prepared in the same manner as above, except that in place of the exemplified coupler (6), there was used an unsubstituted type coupler identical in structure therewith.

After exposure to light, these photographic materials were individually treated in the same manner as in Example 1 to obtain the results as set forth in Table 2.

TABLE 2

| Coupler | Fog | Relative speed | λ-max. | D-max. |
|---|---|---|---|---|
| Exemplified coupler (6) | 0.13 | 230 | 440 | 2.70 |
| Unsubstituted coupler | 0.10 | 100 | 440 | 1.85 |

As is clear from the above table, the coupler of the present invention gives excellent results also in the Fischer's dispersion method.

EXAMPLE 4

A photographic emulsion containing the exemplified couplers (21) and (23) was coated on a support and then dried to prepare a light-sensitive photographic material. This photographic maetrial was exposed to light and then treated with a dilute alkaline developinp solution of pH 13 containing 2 g./liter of $Na_2SO_3$ and 11 g./liter of 4-N-ethyl-N-β-hydroxyethyl aminoaniline. The thus treated photographic material was closely contacted at 24° C. for 3 minutes with an image-receiving sheet containing dimethyl-β-hydroxyethyl-γ-stearoamidopropyl ammonium dihydrogen phosphate (a mordant). After development, the image-receiving sheet was peeled off, whereby a yellow dye formed was transferred to the image-receiving sheet to obtain an excellent positive image.

EXAMPLE 5

An ordinary external development treatment was effected by use of an external developing solution containing the exemplified coupler (22). For comparison, the same treatment as above was effected by use of an external developing solution containing an unsubstituted type coupler identical in structure with the exemplified coupler (22). This results obtained were as shown in Table 3.

TABLE 3

| Coupler | Fog | Relative speed | λ-max. | D-max. |
|---|---|---|---|---|
| Exemplified coupler (22) | 0.05 | 227 | 442 | 2.70 |
| Unsubstituted type coupler | 0.04 | 100 | 443 | 2.43 |

What we claim is:
1. A photographic composition comprising a light sensitive silver halide emulsion and a coupler capable of forming a yellow color image in color photography, said coupler having an open chain active methylene group bonded to two adjacent carbonyl groups, one of the hydro- gen atoms of the active methylene being substituted by a group of the formula

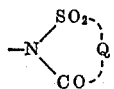

wherein Q is

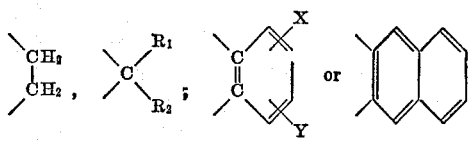

$R_1$ and $R_2$ are lower alkyl, X is hydrogen, halogen or alkoxy, and Y is hydrogen, halogen, amino, acylamide, ureide, lower alkyl, alkoxy or hydroxy.

References Cited
UNITED STATES PATENTS

| | | | |
|---|---|---|---|
| 3,260,715 | 7/1966 | Saunders | 96—100 |
| 3,253,924 | 5/1966 | Loria | 96—100 |
| 3,214,437 | 10/1965 | Loria | 96—100 |

NORMAN G. TORCHIN, Primary Examiner

E. C. KIMLIN, Assistant Examiner

U.S. Cl. X.R.

96—100